United States Patent [19]

Speicher

[11] Patent Number: 4,487,370
[45] Date of Patent: Dec. 11, 1984

[54] SEED AND FERTILIZER SPREADER

[76] Inventor: Paul L. Speicher, 911 W. Main, North Manchester, Ind. 46962

[21] Appl. No.: 359,809

[22] Filed: Mar. 19, 1982

Related U.S. Application Data

[63] Continuation-in-part of Ser. No. 283,655, Jul. 15, 1981, abandoned.

[51] Int. Cl.³ .............................................. A01C 17/00
[52] U.S. Cl. .................................... 239/687; 222/410; 222/561; 222/625
[58] Field of Search ............... 239/681, 683, 687, 685; 222/410, 561, 623, 625

[56] References Cited

U.S. PATENT DOCUMENTS

| 3,602,404 | 8/1971 | Frank | 239/657 X |
| 3,738,546 | 6/1973 | Speicher | 239/687 X |
| 4,326,673 | 4/1982 | Thene | 239/657 |

FOREIGN PATENT DOCUMENTS 504213 4/1939 United Kingdom ................ 222/561

*Primary Examiner*—Andres Kashnikow
*Attorney, Agent, or Firm*—Eugene C. Knoblock

[57] ABSTRACT

A broadcasting apparatus for pulverant or granular material including a frame supported by wheels, an axle extending between the wheels and connected in driving relationship with at least one of the wheels, a material hopper mounted on the frame and having an opening in its bottom wall, a valve adjustable across the hopper opening to control the flow of material therefrom, a guide for the valve to retain the valve in selected position adjacent the hopper opening, a dial having a cam surface, a member connected to the valve and bearing on the dial cam surface, a mount for the dial connected to the bottom wall of the hopper and guiding the connecting member, a broadcasting plate disposed beneath the valve and connected to the axle to rotate upon movement of the wheels, and an agitator within the hopper connected to rotate with the shaft and broadcasting plate. The valve guide, dial and dial mounts being formed of resilient plastic material and the guide and dial mount having snap interlock connections with said hopper. The broadcasting plate has equispaced radial vanes at its upper face, spaced openings located centrally therein below the hopper opening and between adjacent upper radial vanes, and lower radial vanes at its peripheral portions spaced outwardly from said spaced openings.

5 Claims, 16 Drawing Figures

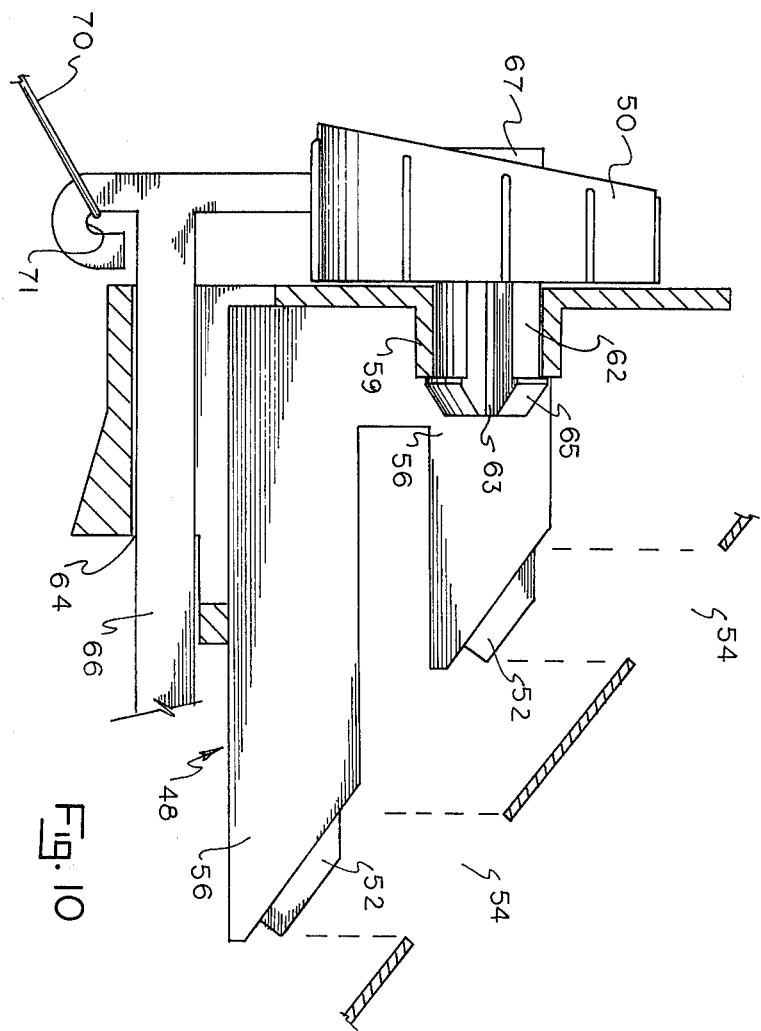

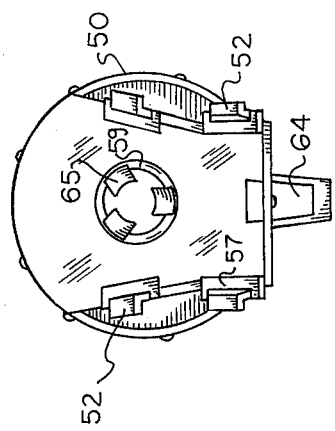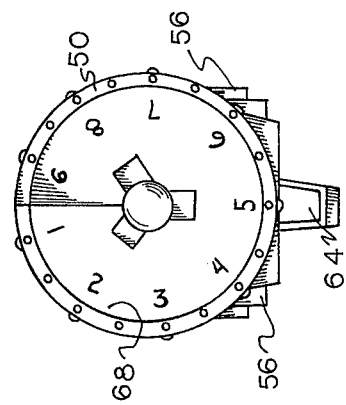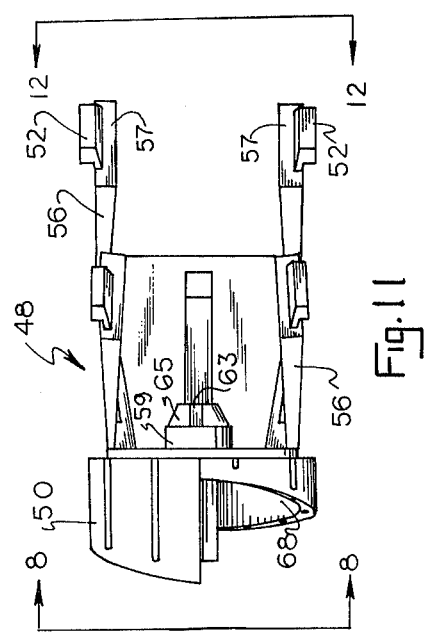

SEED AND FERTILIZER SPREADER

CROSS-REFERENCE TO RELATED APPLICATIONS

This is a continuation-in-part of my copending application filed July 15, 1981 and having Ser. No. 283,655, now abandoned.

SUMMARY OF THE INVENTION

This invention relates to a material spreader which may be used to spread pulverant or granular material such as fertilizer or seeds. The spreader includes a hopper, a rotatable broadcasting plate below a hopper discharge opening for dispersing the material, a frame mounting the hopper and supported by wheels having a driving connection with the rotatable plate, a valve plate at the bottom of the hopper to regulate the size of the hopper discharge opening, and means for setting the valve plate in selected adjustment.

It is an object of this invention to provide a material spreader which includes a novel rotatable broadcasting plate which causes a balanced distribution of material in operation.

Another object is to provide a material spreader having a rotatable broadcasting plate having a plurality of equispaced holes therethrough adjacent to the center of the plate and below a hopper discharge opening.

Another object is to provide a material spreader having a rotatable centrally apertured broadcasting plate having radial vanes at its upper surface and relatively short equispaced radial vanes projecting from the peripheral portion of its lower surface.

Another object is to provide a material spreader with a resilient mount for a material flow control dial which has an interlocking connection with the hopper.

Another object is to provide a material spreader with a novel construction of material flow controlling dial and dial mount which is preassembled and is mounted on the hopper in assembled condition by a resilient integral interlock.

Another object is to provide a material spreader which includes novel self-anchoring guide means for a material flow valve.

Another object is to provide novel resilient interlocks mounted in openings in the bottom of a hopper and constructed to seal the openings in which they are mounted so as to prevent leakage of pulverant material at said openings.

A further object is to provide a device of this character wherein the number of parts and the time required to asemble the device are reduced compared to prior constructions of such devices.

Other objects of this invention will be apparent from the following description.

BRIEF DESCRIPTION OF THE DRAWINGS

FIG. 8 is a front view of the adjustment controlling dial.

FIG. 10 is a vertical sectional view taken along line 10—10 of FIG. 9.

FIG. 11 is a top view of the adjustment controlling dial and dial mount.

FIG. 12 is a rear view of the adjustment controlling dial and dial mount.

DESCRIPTION OF THE PREFERRED EMBODIMENT

Figure 1:
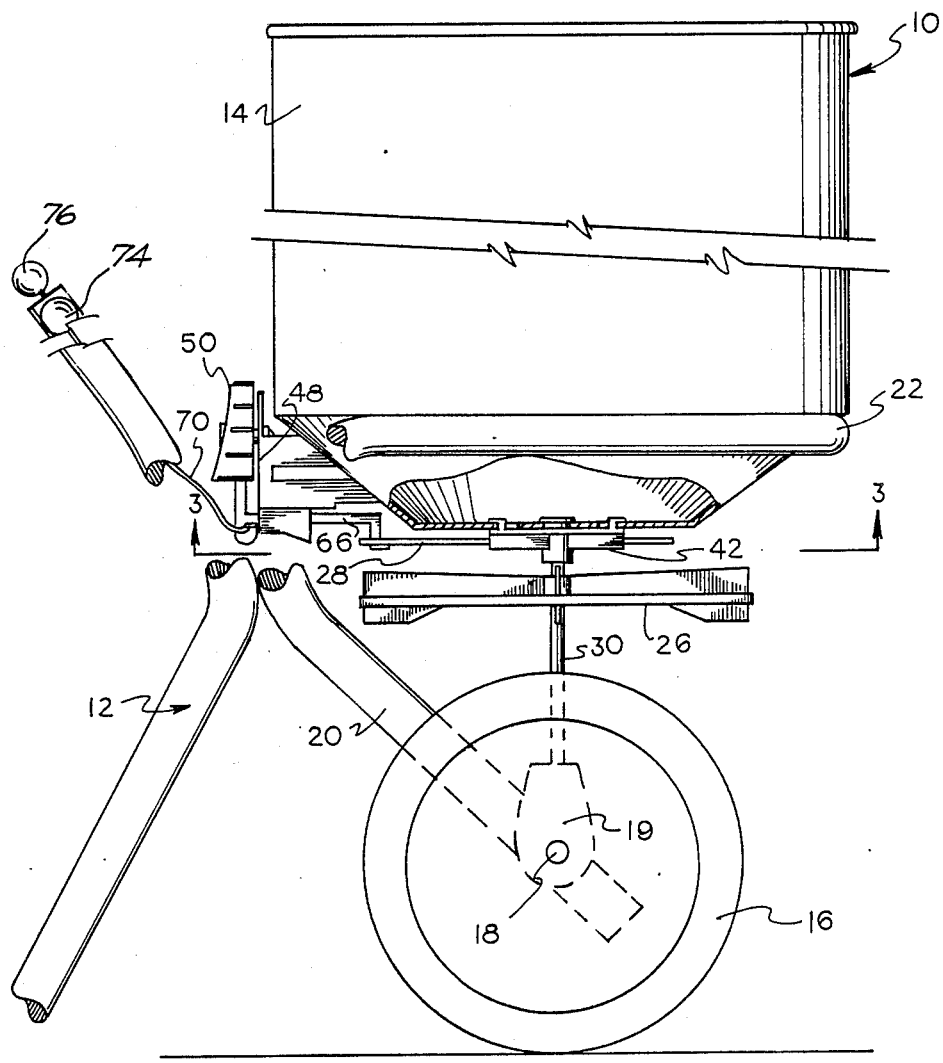
FIG. 1 is a side view of the material spreader with portions broken away.
Figure 2:
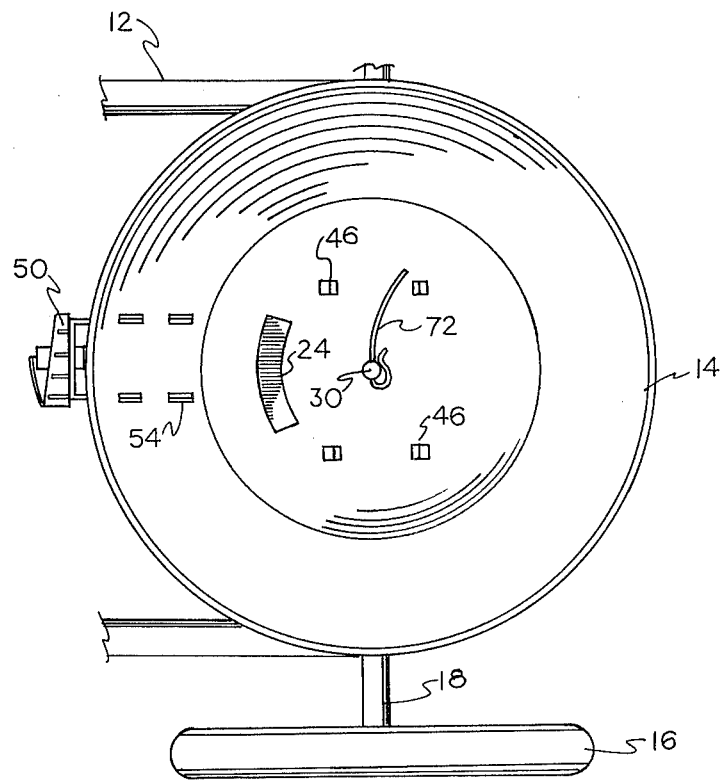
FIG. 2 is a fragmentary top view of the material spreader.

The preferred embodiments illustrated are not intended to be exhaustive or to limit the invention to the precise forms disclosed. They have been chosen and described in order to explain the principles of the invention and its application and practical use to thereby enable others skilled in the art to utilize the invention.

The material spreader 10 of this invention generally includes a tubular frame 12, a hopper 14, and a pair of ground engaging wheels 16 journaling an axle 18 at its ends. Axle 18 is carried adjacent its ends by downwardly extending sections 20 of frame 12. Frame 12 includes a horizontal U-shaped section 22 (FIG. 3) which supports hopper 14 over axle 18. Hopper 14 has an arcuate opening 24 in the central portion of its bottom wall to allow material to fall onto a rotatable broadcasting plate 26 which is mounted on a vertical shaft 30. A valve plate 28 is slidably attached to the bottom of hopper 14 and controls the flow of material through opening 24 of the hopper onto broadcasting plate 26. Shaft 30 is drivingly connected at its lower end to axle 18 at 19 and is journaled in a central opening in the bottom wall of hopper 14 at its upper end. Broadcasting plate 26 is connected to shaft 30 to rotate with it. The above described arrangement is more fully disclosed in U.S. Pat. No. 3,394,892 granted on July 30, 1968.

Figure 4:
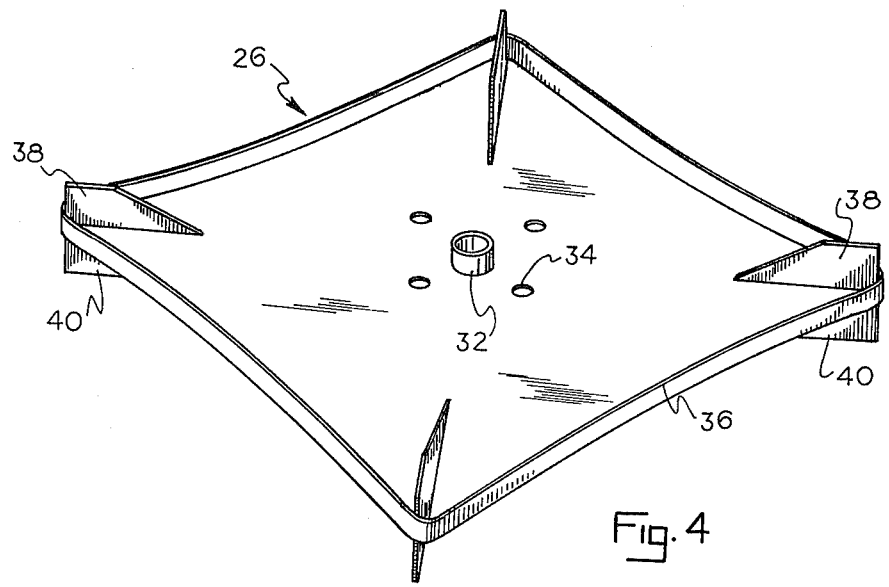
FIG. 4 is a bottom perspective view of the broadcasting plate.
Figure 5:
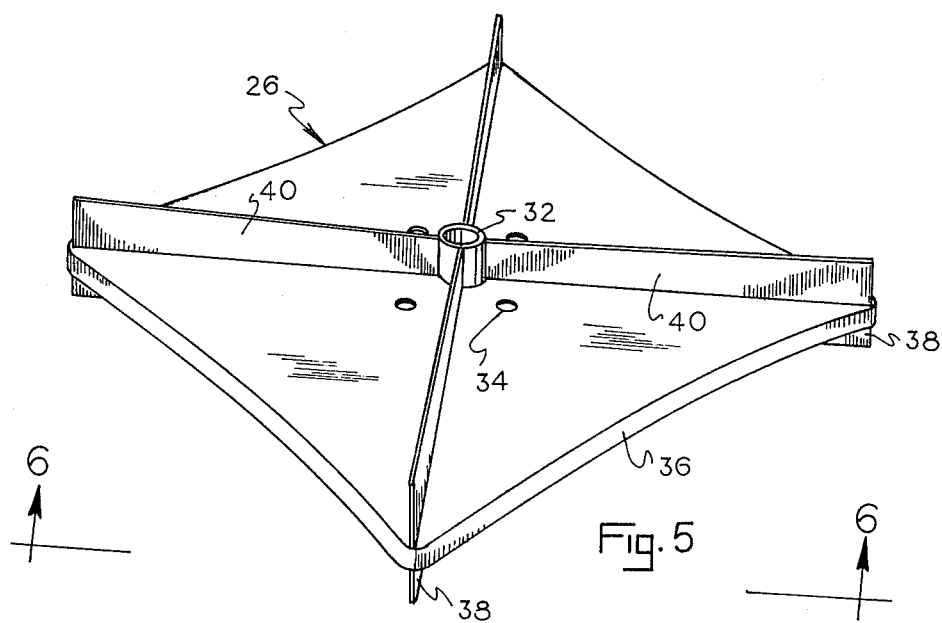
FIG. 5 is a top perspective view of the broadcasting plate.
Figure 6:
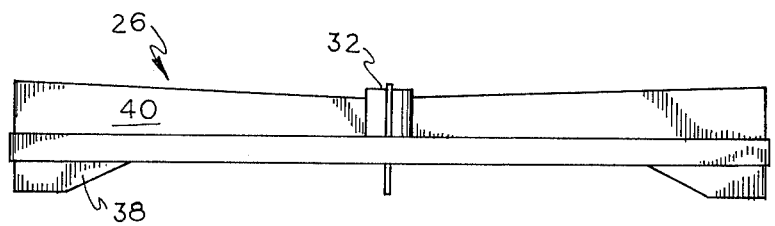
FIG. 6 is an edge view taken along line 6—6 of FIG. 5.

Broadcasting plate 26, shown in FIGS. 4–6, is generally square in shape with a slight concavity at its upper surface and has a central tubular hub portion 32 to receive shaft 30. A circular series of small equispaced openings 34 are formed in plate 26 around and adjacent to hub 32. A flange 36 is formed along the periphery of plate 26 and extends downwardly therefrom. A substantially vertical vane or blade 38 projects downwardly at each corner of plate 26 and extends substantially radially toward opening 32. Each vane 38 is of a vertical dimension greater than the vertical dimension of flange 36 and terminates spaced from the hub 32 and from plate openings 34. The upper surface of plate 26 is characterized by upstanding vanes or blades 40 each preferably extending outwardly from hub 32 along a radial line to a corner of the plate. Blades 40 are preferably tapered in height with their greatest vertical dimension at their outer ends, and each blade is positioned between adjacent openings 34.

Figure 3:
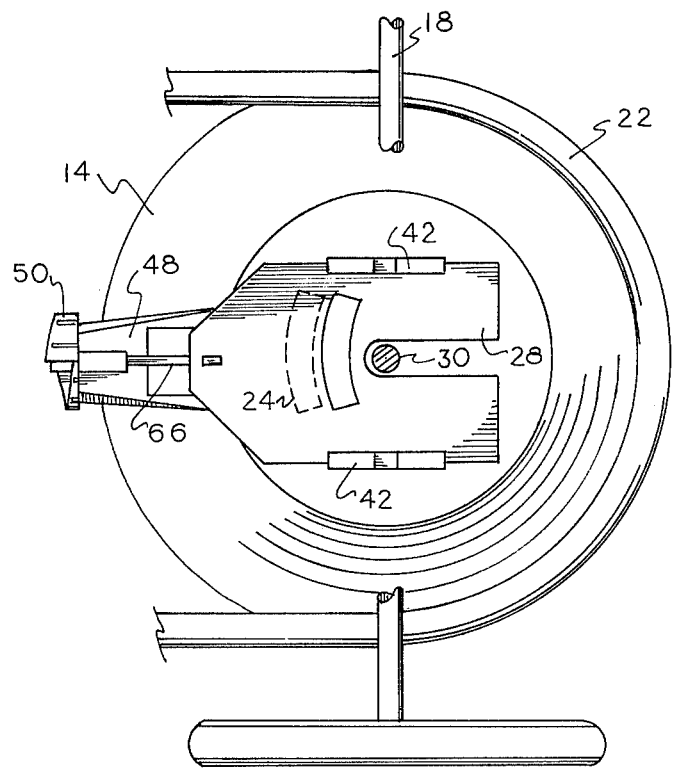
FIG. 3 is a horizontal sectional view taken along line 3—3 of FIG. 1.
Figure 7:
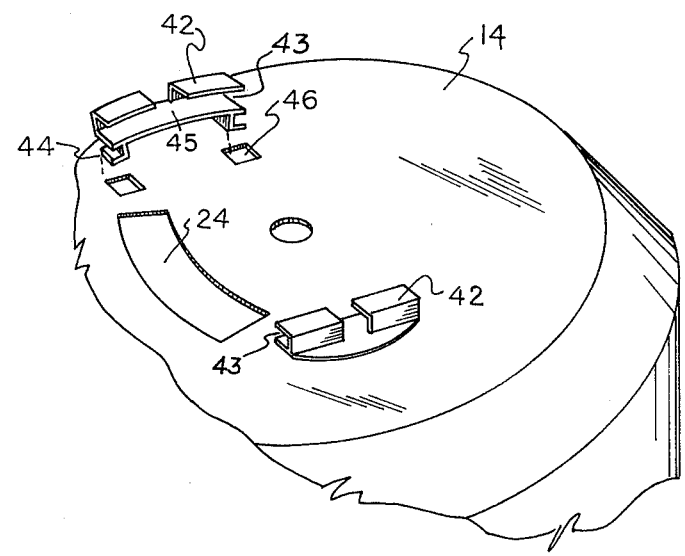
FIG. 7 is a perspective view illustrating the attachment of the valve plate guides.
Figure 13:
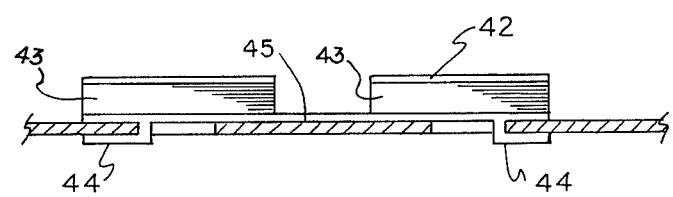
FIG. 13 is a vertical sectional view of a valve plate guide illustrating its attachment to the hopper wall.

Plate 28 is retained in position at the bottom of hopper 14 by guide channels 42 as shown in FIGS. 3 and 7. Channels 42 are formed of a resilient plastic material such as Nylon or Delrin. Each channel preferably has a pair of spaced aligned C-shaped portions 43 which slidably receive a longitudinal edge of plate 28. Each channel 42 has an outwardly facing transverse ear 44 at each end thereof. Each ear 44 is adapted to be received and anchored in one of a pair of spaced slots 46 formed in the bottom of hopper 14. The common wall 45 of the spaced C-shaped portions 43 at whose ends ears 44 are formed is sufficiently flexible and resilient to bend to permit the ears 44 to seat and anchor in hopper openings whose outermost edges are spaced apart a distance slightly less than the spacing of the outermost edges of the ears 44. When mounted in place, the guides and their ears seal each hopper slot at which they are anchored. Channels 42 are installed by bending them as illustrated in FIG. 7 to permit ears 44 to enter slots 46. Insertion of ears 44 into slots 46 and release of the channel 42 permits resumption by the channel of its original shape and thereby firmly secures the channel to the bottom wall of the hopper.

Figure 9:
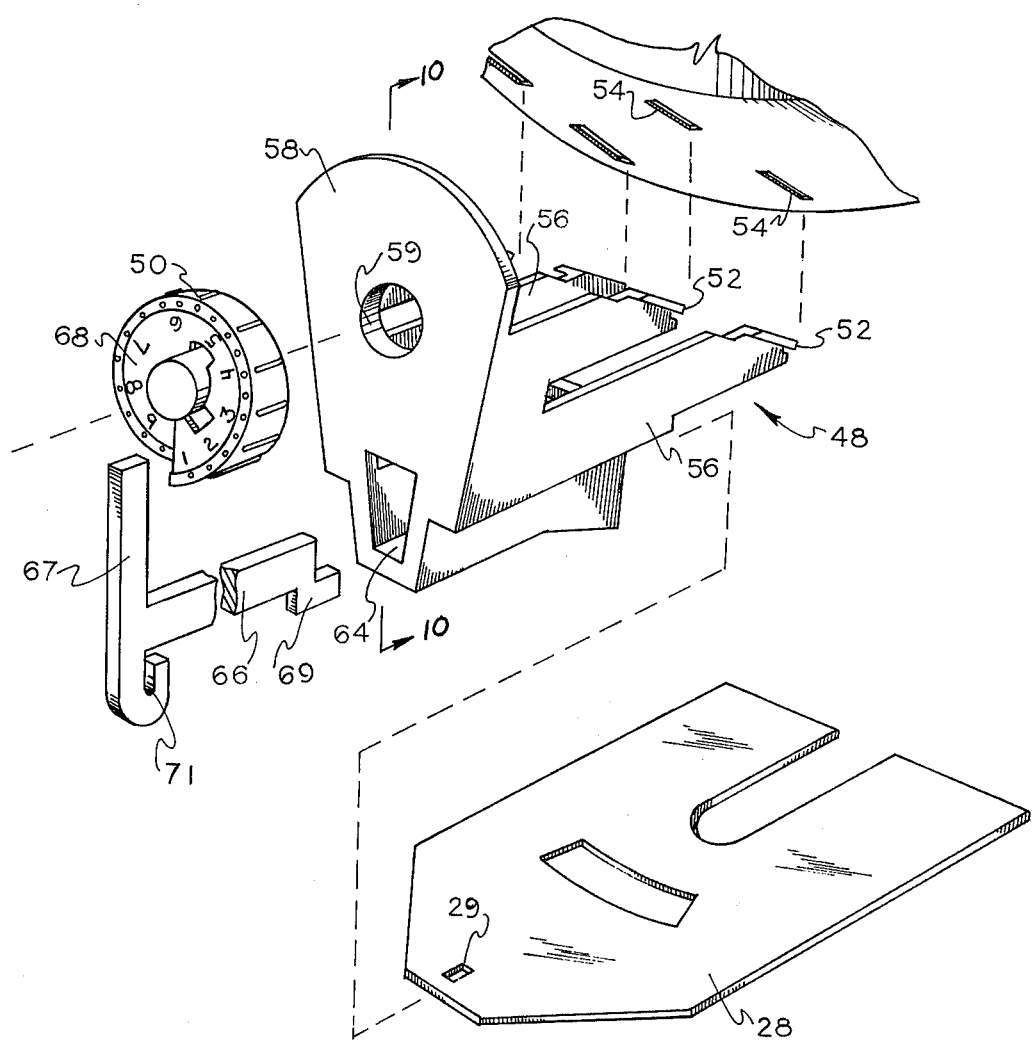
FIG. 9 is an exploded perspective view of the valve adjustment controlling dial and dial mount.

FIGS. 9 and 10 illustrate the dial mount 48, the dial 50, and the dial controlled connector 66 to the valve plate 28. Dial mount 48 is formed of a resilient shape retaining plastic material, such as Delrin or Nylon. Mount 48 is attached to the marginal frusto conical portion of the margin of the bottom wall of hopper 14 by the locking interfit into openings 54 of the hopper bottom of ears 52 formed integrally with diverging pairs of mounting arms 56. Mount 48 is fastened to the hopper bottom wall by pressing toward each other the opposed arms 56 sufficiently to permit insertion of ears 52 into openings 54 and then releasing arms 56 to permit the arms 56 to spread so that the ears latch at the hopper bottom wall adjacent openings 54. Each mounting arm 56 includes a portion 57, offset from ear 52 at the base of the ear. Mounting arm portions 57 are so formed that when the ears are inserted into place within openings 54 the arm portion 57 is held snugly against the outer surface of hopper 14 to seal the opening against leakage of pulverant material from within the hopper. The plate 58 carried by arms 56 has a tubular part 59 substantially centrally therein which receives the tubular shaft 62 of dial 50. Shaft 62 has longitudinal slots 63 defining parts at whose ends project a tapered shouldered portion 65 to accommodate a snap fit with part 59 of plate 58 as illustrated in FIG. 10. The fit of shaft 62 is preferably a frictional fit such that dial 50 will remain in a selected rotative position relative to plate 58. Mount 48 includes an open ended guide tube 64 in which is slidable an elongated adjusting link 66. Link 66 includes a perpendicularly projecting arm 67 at one end, which arm bears against a cam surface 68 of dial 50. The opposite end of link 66 includes a hook 69 which fits within an aperture 29 of the valve plate 28. A flexible wire 70 is connected to link 66 at 71 and extends through tubular frame part 12 on which a handle 74 is mounted. A hand grip 76 is mounted on wire 70 adjacent the handle to permit the operator to shift wire 70 and link 66 to adjust valve plate 28 endwise. The setting of dial 50 controls the extent of travel of wire 70, link 66 and valve 28 between open and closed positions by virtue of engagement of arm 67 with the dial. The material flow from hopper 14 through opening 24 onto broadcasting plate 26 is thus controlled by setting dial 50 in a selected rotative position.

Figure 16:
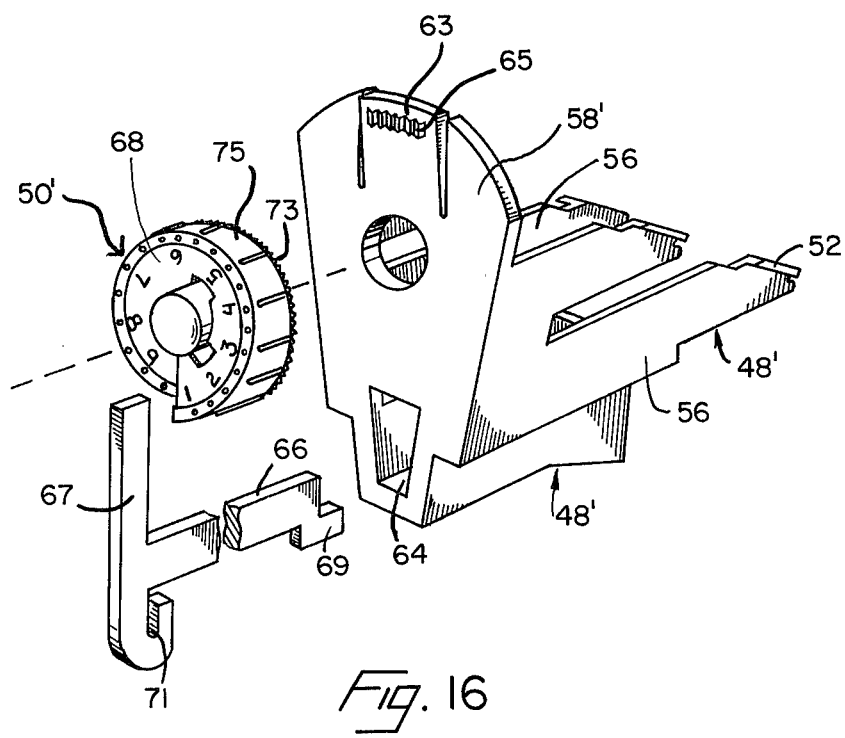
FIG. 16 is an exploded perspective view of a second embodiment of the adjustment controlling dial and dial mount.

A second embodiment of the dail mount 48' and a dial 50' is shown in FIG. 16. Plate 58' includes a resilient section or tongue 63 formed between spaced kerfs which has a row of teeth 65 projecting from its face near its outer edge. Dial 50' has teeth 73 projecting from its surface confronting tongue 63. When dial 50' is attached to dial mount 48' in a manner substantially similar to the attachment of the dial and dial mount as above described in the first embodiment, teeth 65 of the tongue 63 and teeth 73 of the dial interfit and interlock to prevent accidental rotation of the dial as spreader 10 passes over rough terrain. Resilient tongue 63 flexes to permit a ratchet-type of interaction between teeth 65 and teeth 73 as dial 50' is manually rotated to a selected setting.

An agitator 72 is mounted on the upper end of shaft 30 within and adjacent to the bottom of the hopper 14 and rotates with the shaft 30 to stir the contained pulverant material and thus promotes the continuous flow of material from hopper 14 through outlet 24 at a selected rate as determined by the rotation position of dial 50 maintained by the engagement of spaced projections or teeth on the confronting faces of dial 50 and plate 58.

The construction of the broadcasting plate 26, with its central openings 34 and its vanes 38 and 40, produces a distinct improvement in the operation of the device with respect to the uniformity of discharge of pulverant material as the plate 26 rotates when the spreader is advanced. This action is characterized by direct downward fall of the material from hopper discharge opening 24 onto the rotating distributor plate 26 outwardly of openings 34, as distinguished from fall of the material in a laterally displaced path which has heretofore characterized spreaders having conventional rotary spreader plates with upwardly projecting substantially radial vanes but not provided with central openings 34 and bottom marginal vanes 38. In other words, this spreader distributes pulverant material by a combination of centrifugal force and air discharged upwardly at the central part of the distributor through openings 34, which air flow is produced by the bottom vanes 38.

Figure 14:
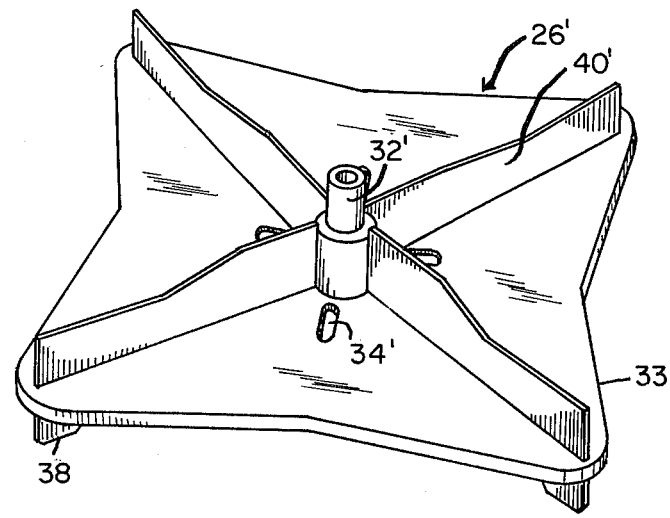
FIG. 14 is a top perspective view of a second embodiment of the broadcasting plate.
Figure 15:
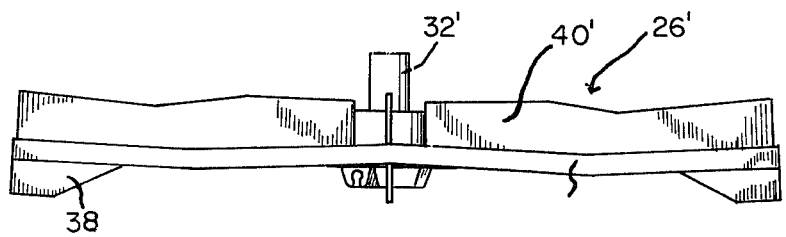
FIG. 15 is an edge view as viewed in the direction of the arrow in FIG. 14.

FIGS. 14 and 15 show a second embodiment 26' of the broadcasting plate which produces similar improvement in the discharge pattern of the pulverant material. Broadcasting plate 26' is generally square in shape with a slight concavity at its upper surface and includes a central tubular hub portion 32'. The sides 33 of plate 26' are slightly indented between corners. Vanes or blades 40' extend outwardly from hub 32' along radial lines to the corners of plate 26'. Each blade 40' is preferably tapered in height intermediate its ends. The greatest vertical dimension of each blade 40' is adjacent to hub 32'. The lowest vertical dimension of end blade is preferably intermediate the hub and the outer end of the blade, and the height of blade 40' increases from the lowest vertical dimension to a height at outer end which is less than the greatest vertical dimension. Plate 26' also includes openings 34' formed in the plate adjacent hub 32'. Openings 34' are generally oblong in shape.

Another important characteristic of this improved spreader construction is the economy of manufacturing resulting from the fabrication of various parts thereof from molded or otherwise formed plastic parts and reduction of the number of securing members such as screws, bolts and nuts which heretofore have been required for spreaders of this type. Thus, the plastic parts, such as the dial mount 48, valve plate guides 82, and their integral anchor members, such as ears 44 on guide channels 42 and ears 52 on dial mounting arms 56, have sufficient flexibility to permit snap interlock of such parts with the hopper at openings in the hopper. Similarly, the provision of slotted tubular headed shaft 62 on dial 50 accommodates assembly of the dial 50 on the mounting plate 58 by simply inserting it endwise into the tubular part 59 of said plate. The labor required to assemble a spreader is minimized by minimizing the number of securing members which must be handled and the rapidity with which snap interlocks of parts may be accomplished. Another economical feature of construction is the construction of the adjusting link 66 with its integral dial-engaging part 67 and valve plate engagin hook 60. Likewise the valve plate wire 70 on which a hand grip is mounted at one end and which is hooked to link 66 at 71 provides a simple, easily installed and economical valve operating means.

It will be understood that the novel features of this construction may be used on models and types of spreaders different from those herein illustrated. For example, the novel rotary distributor plate with central apertures and vanes projecting from both the upper and the lower faces thereof may be utilized in spreaders powered by electrical motors, air motors or hydraulic motors and also in hand crank operated spreaders.

The invention is not intended to be limited to the details given above but may be modified within the scope of the appended claims.

What I claim is:

1. In a spreader for pulverant material including a hopper having a valve controlled bottom discharge opening, a substantially horizontal rotatable broadcasting member below said hopper discharge opening, means for rotating said broadcasting member, and means for actuating said discharge control valve, the improvement wherein a member constituting a combination dial mount and valve actuating guide is mounted on said hopper, said last named member including a plurality of spaced normally divergent resilient legs each terminating in a hook portion, said hopper bottom having a plurality of apertures spaced from said discharge opening and spaced apart differently than the normal spacing of the hook mounting ends of said legs, said legs being yieldable to fit in said apertures with said hook portions having snap interlocks with said hopper bottom at said apertures, the portion of said hopper bottom at which said legs are interlocked is substantially frusto conical and said legs extend substantially horizontally from said frusto conical portion.

2. The construction defined in claim 1, wherein said dial mounting portion of said member includes a plate portion to which a dial member is mounted for rotative adjustment, said plate portion having a central opening and said dial member including a tubular longitudinally slotted central projection having enlarged shouldered end portions, said tubular projection fitting rotatably in said plate opening and anchored at said shouldered end portions.

3. The construction defind in claim 1, wherein each leg has an end face which bears against said hopper frusto conical portion to close an aperture when said hook portions are interlocked in said apertures.

4. The construction defined in claim 2, wherein said plate portion includes a tongue portion having spaced projecting teeth, the surface of said dial member confronting said plate and tongue having a circular series of spaced teeth which engage the teeth on said tongue when said tubular projection is anchored within said plate opening, said tongue being resiliently shiftable whereby said dial member may be manually rotated to selected position.

5. In a spreader for pulverant material including a hopper having a valve controlled bottom discharge opening, a substantially horizontal rotatable broadcasting member below said hopper discharge opening, means for rotating said broadcasting member, and means for adjusting said valve, the improvement wherein a member constituting a valve adjusting support is mounted on said hopper, valve adjusting means is carried by said support and includes a dial rotatably carried by said support and having a circular series of spaced teeth projecting from a surface thereof adjacent said support, said support including a resilient tongue having projections interlocking with selected teeth in all rotative adjustments of said dial.

* * * * *